United States Patent
Denecheau et al.

(10) Patent No.: US 7,130,927 B2
(45) Date of Patent: Oct. 31, 2006

(54) METHOD OF BANDWIDTH MANAGEMENT BETWEEN THE STATIONS OF A LOCAL AREA NETWORK

(75) Inventors: Lionel Denecheau, La Colle sur Loup (FR); Denis Esteve, Vence (FR); Patrick Sicsic, La Colle sur Loup (FR)

(73) Assignee: International Business Machines Corporation, Armonk, NY (US)

( * ) Notice: Subject to any disclaimer, the term of this patent is extended or adjusted under 35 U.S.C. 154(b) by 697 days.

(21) Appl. No.: 10/188,534

(22) Filed: Jul. 2, 2002

(65) Prior Publication Data

US 2003/0041164 A1 Feb. 27, 2003

(30) Foreign Application Priority Data

Jul. 5, 2001 (EP) .................... 01480053

(51) Int. Cl.
G06F 15/16 (2006.01)
(52) U.S. Cl. ........................ 709/251; 370/477
(58) Field of Classification Search ................ 709/217, 709/218, 220, 223, 225, 229, 251, 206, 200–202; 370/258, 452, 453, 468, 477

See application file for complete search history.

(56) References Cited

U.S. PATENT DOCUMENTS

| 4,445,116 | A | * | 4/1984 | Grow | ........................ 370/455 |
| 5,175,732 | A | * | 12/1992 | Hendel et al. | ............... 370/463 |
| 5,201,056 | A | * | 4/1993 | Daniel et al. | ................... 712/41 |
| 5,313,466 | A | * | 5/1994 | Zhao et al. | .................. 370/453 |
| 5,383,186 | A | * | 1/1995 | Shin et al. | ................... 370/453 |
| 5,390,182 | A | * | 2/1995 | Zheng | ......................... 370/236 |
| 5,404,424 | A | * | 4/1995 | Zhao et al. | .................. 370/453 |
| 6,393,489 | B1 | * | 5/2002 | Sambamurthy et al. | ..... 709/250 |
| 6,400,819 | B1 | * | 6/2002 | Nakano et al. | ............. 379/229 |

OTHER PUBLICATIONS

Venkatramani, Chitra. "The Design, Implementation and Evaluation of RETHER: A Real-Time Ethernet Protocol". Presented Nov. 1996. Published Dec. 5, 1998 at http://www.ecsl.cs.sunysb.edu/~chitra/rether/.*

* cited by examiner

Primary Examiner—Moustafa M. Meky
(74) Attorney, Agent, or Firm—Kunzler & Associates

(57) ABSTRACT

A method of bandwidth management for ensuring a guaranteed bandwidth to each station of a transmission network (18) comprising a plurality of stations (10, 12, 14, 16), forming a logical ring wherein one of the stations is the ring manager and wherein a token frame is circulating along the logical ring from station to station, each station being allowed to transmit data to other stations over the transmission network when it receives the token frame while holding the token during the time the station is transmitting data. A credit of data bytes allowed to be transmitted is allocated to each station upon reception of the token frame when an Utilization Rate based upon the number of data bytes sent by all stations since the preceding reception of the token frame is greater than a predetermined threshold.

22 Claims, 3 Drawing Sheets

METHOD OF BANDWIDTH MANAGEMENT BETWEEN THE STATIONS OF A LOCAL AREA NETWORK

TECHNICAL FIELD

The present invention relates to the bandwidth management in a data transmission network of the Ethernet type and relates in particular to a method of bandwidth management between the stations of an Ethernet network based upon the utilization rate of the network.

BACKGROUND

On local Area Networks (LANs) of the Ethernet type able to transmit the data at speeds higher than one gigabit/s, an unlimited number of stations can be connected to a shared medium. To control the exchange of data between the stations connected on the shared medium, Ethernet uses a protocol called Carrier Sense, Multiple Access Collision Detect (CSMA/CD). The "Multiple Access" part means that every station is indeed connected to the shared medium forming a single data path. The "Carrier Sense" part means that before transmitting data, a station checks it to see if any other station is already sending something. If the transmission medium appears to be idle then, the station can actually begin to send data. However, two stations can start transmitting at the same time, causing a collision. When this occurs, each interfering station is made able to detect it. Hence, all stations attempt to transmit, back off, and try a retransmission at randomly selected later times thus minimizing the chance of another collision.

Although Ethernet does not set an upper limit to the number of stations that can be connected on a same transmission medium there are, in practice, drastic limitations. Generally speaking, as more users are added to a shared network or, as applications requiring more data are added, performance inevitably deteriorates. This is because all users become competitors in trying to use a common resource: the shared transmission medium. It is generally agreed that, on a moderately loaded 10 Mbps Ethernet network, being shared by 30–50 users, the network can only sustain throughput in the neighborhood of 2.5 Mbps after accounting for packet overhead, inter packet gaps and collisions resulting of the use of the hereabove CSMA/CD protocol. Thus, yet simple, CSMA/CD protocol, suffers drastic limitations in its ability to take advantage of the intrinsic performance of the shared transmission medium i.e., 10 Mbps in this example. Further increasing the number of users (and therefore packet transmissions) creates an even higher collision potential. Since collisions occur when two or more stations attempt to send information at the same time, when these stations realize that a collisions has occurred, they must, to obey standard, all shut off for a random time before attempting another transmission. This tends to add a considerable overhead, severely impacting performance, until the mechanism just collapses when medium is attempted to be too much utilized.

One well-known solution to alleviate this problem is to segment traffic over independent, disjoint, smaller collision domains, but at the expanse of having to put in place extra devices to allow communication between the independent pieces thus created of a LAN. This may be a bridge or a switch. For example, an eight-port high-speed switch can support eight Ethernets, each running at a full 10 Mbps so as to be able to interconnect more users on what appear to them as a single LAN. Such a solution consisting in creating a more expensive and complicated network goes against the original objectives of the Ethernet LAN that wanted to be a very inexpensive solution, simple to administrate for local communications, over a campus or between the employees of a company dispersed over a group of buildings.

A solution to the above problem consists in implementing a passing-token mechanism of Token Ring LAN type so that the physical Ethernet network becomes collision free and therefore can be used at higher rates. In this mechanism, a logical ring is formed between the stations and a token is circulated among these stations along the logical ring. Then, transmitting from any one station of the logical ring is only permitted while holding the token thereby, preventing collisions from happening. But, even though this solution prevents the collisions between stations from happening, it does not prevent a station from monopolizing the bandwidth while the other stations cannot transmit.

Therefore, another solution consists in always forming a logical ring between the stations wherein a token is circulating from station to station. But, a credit of data bytes allowed to be transmitted by each station of the logical ring is allocated to the station, such a credit being increased in proportion to the time spent since the preceding reception of the token and in proportion to a Committed Information Rate (CIR) which is the guaranteed transmission rate that the station can use. Unfortunately, this solution which ensures that each station will never transmit more than the allowed percentage of the bandwidth is somehow limitative. Assuming that the logical ring includes 10 stations and that each of them is configured with a CIR which is 10% of the total bandwidth. If only 2 stations need to transmit at a certain time, the logical ring will be used only 20% of its capacity and still, the 2 stations will have to limit their traffic based on their CIR values.

SUMMARY OF THE INVENTION

Accordingly, the main object of the invention is to provide a method of bandwidth management between the stations of an Ethernet network enabling each station of a logical ring to use a bandwidth determined according to predefined parameters when the total utilization of the logical ring reaches a predetermined threshold.

The invention relates therefore to a method of bandwidth management that ensures a guaranteed bandwidth to each station of a transmission network comprising a plurality of stations forming a logical ring wherein one of the stations is the ring manager and wherein a token frame is circulated along the logical ring from station to station, each station being allowed to transmit data to other stations over the transmission network when it receives the token frame while holding the token during the time the station is transmitting data. A credit of data bytes allowed to be transmitted is allocated to each station upon reception of said token frame when a Utilization Rate based upon the number of data bytes sent by all stations since the preceding reception of the token frame is greater than a predetermined threshold.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

Figure 1:
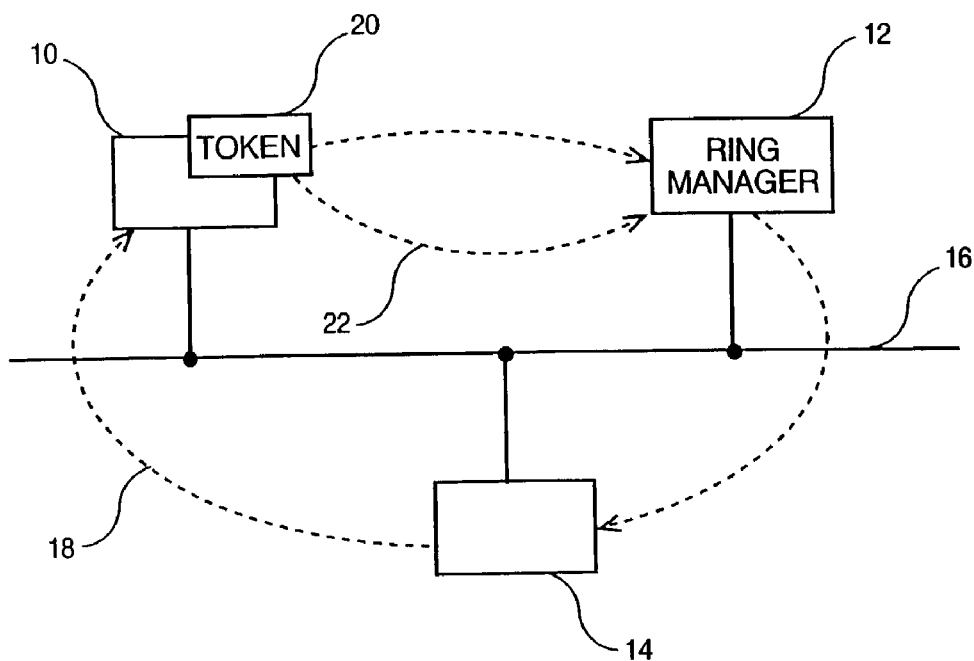
FIG. 1 is a schematic representation of some stations of an Ethernet network organized in a logical ring wherein the invention is implemented.

Referring to FIG. 1, an Ethernet LAN includes several stations 10, 12 and 14 physically connected on the shared medium 16, exactly as with a regular collision Ethernet LAN, and organized so that they form a logical ring 18. This is achieved through the circulation of a token 20 which takes the form of a special Ethernet frame, forwarded 22 from one station to a next one, e.g., from station 10 to station 12.

It must be noted that one of the stations within the ring, for example the station 12, is the ring manager at a given time. The ring manager in charge of managing the logical ring is generally the first station which has been incorporated in the logical ring.

It is worth noting here that all stations connected on the same LAN segment need to participate in the collision-free ring 18 thus formed. Indeed, insofar as the invention is relating to a utilization rate based upon the bandwidth of each station, it is required that such a utilization rate takes the bandwidth of all stations within the network into account.

Figure 2:
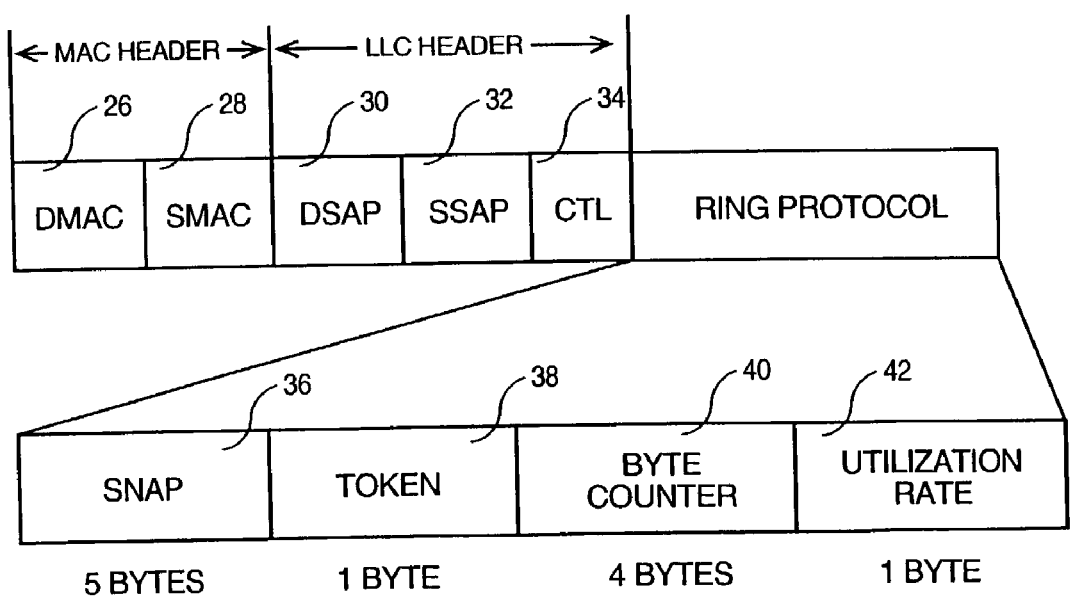
FIG. 2 illustrates the format of a token frame used in a logical ring according to FIG. 1.

As represented in FIG. 2, the token frame includes three parts: the MAC header, the LLC header and the ring header.

MAC Header (Standard)
An Ethernet Destination MAC address 26, i.e. the MAC address of the next ring station.
An Ethernet Source MAC address 28, i.e. the MAC address of the station sending the token frame.

LLC Header (Standard)
A destination SAP (Service Access Point) 30 which, in the OSI model is due to identify the individual application on a host which is sending a packet. The destination SAP address is the standard way of actually defining the type of application in the following SNAP (Sub-Network Access Protocol) field.
A source SAP 32, i.e. the counterpart of the here above destination SAP.
A control field 34 which indicates this is a UI (Unnumbered Information) frame.

Ring Protocol (Specific to the Logical Ring)
A SNAP 5-byte header field introducing a new Ether-type, i.e. a collision-free Ethernet ring 36.
A 1-byte token field 38 to help managing the circulation of the token, however not mandatory, and which takes a default HEX value of 00.
A Byte counter 40 of 4 bytes which is reset by the ring manager upon receiving the token and is incremented by each station transmitting bytes over the ring.
A utilization rate 42 of 1 byte which is computed by the ring manager upon receiving the token frame and is read by each station to know whether the credit mechanism has to be triggered.

Therefore, the token frame is a standard Ethernet frame uniquely identified through its SNAP field 36. Its sole possession, by a station, is thus the implicit permission to use the shared transmission medium on which functional frames can be placed before token is passed to the next station in sequence.

The logical ring 18 is simply a list of stations pertaining to the ring. Actually, each station needs only to hold a record of the next and previous station identifiers in the form of their MAC addresses. Thus, while a station such as station 10 has the token, it is allowed to transmit functional frames destined to another station (if it has indeed something to transmit.) Transmission of the token is simply achieved by placing the functional frames on the shared transmission medium 16, irrespective of the mode of propagation (unicast, multicast or broadcast) so that the receiving station(s), that are listening, can catch it. Upon completion of transmission, the station that currently holds the token, e.g. station 10, must forward it 22 through the shared transmission medium, to the next station in sequence of the logical ring, e.g. station 12, using the MAC address.

Figure 3:
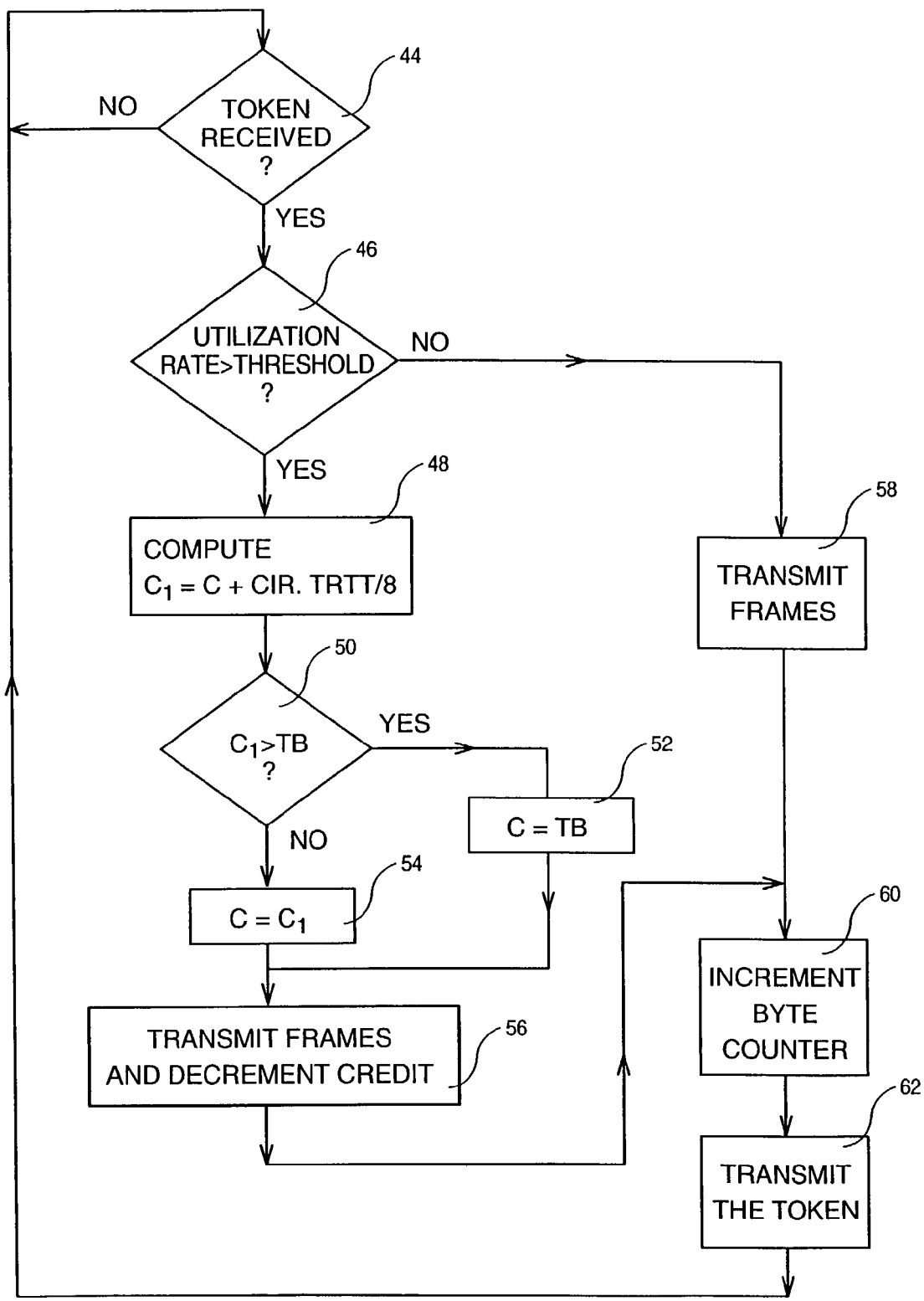
FIG. 3 represents a flow chart of the steps of the method according to the invention used by each station when receiving the token frame.

The flow chart of the steps of the method executed within the stations of the logical ring is illustrated in FIG. 3. After the initialization of the station parameters (not shown), the station waits for the token frame (step 44) and loops back as long as the token frame is not received. Upon receiving the token frame, the station checks whether the utilization rate (field 42 of the token frame) is greater than a predetermined threshold (step 46). If so, The processing unit of the station computes (step 46) an intermediary variable as follows:

$$C_1 = C + CIR * TRTT/8$$

which means that a credit of C bytes allocated to the station can be increased by a number of bytes which is proportional to the token round trip time TRTT of the token frame from the preceding reception by the station and to a Committed Information Rate (CIR) which is the guaranteed transmission rate in bits/second that the station can use to transmit data. At this step, a check is performed to ascertain whether the value of $C_1$ is greater than a Transmission Burst (TB) which is the maximum number of data bytes the station may transmit on the network upon reception of the token TB (step 50). If so, C is set to TB (step 52) since TB is the maximum number of bytes which are allowed to be transmitted. If not, the value of C is set to $C_1$ (step 54). Then, the station transmits its data frames over the network and decrements its credit C (step 56).

If the utilization rate received in the token frame is less than the threshold, there is no need to limit the transmission of the frames by the stations and therefore, the station may transmit its frames (step 58) without being limited by a credit of bytes.

In both cases, after the station has transmitted its frames, the byte counter contained in the token frame (field 40) is incremented by the number of bytes which have been transmitted (step 60). Then, the token frame is sent to the next station over the logical ring (step 62).

Figure 4:
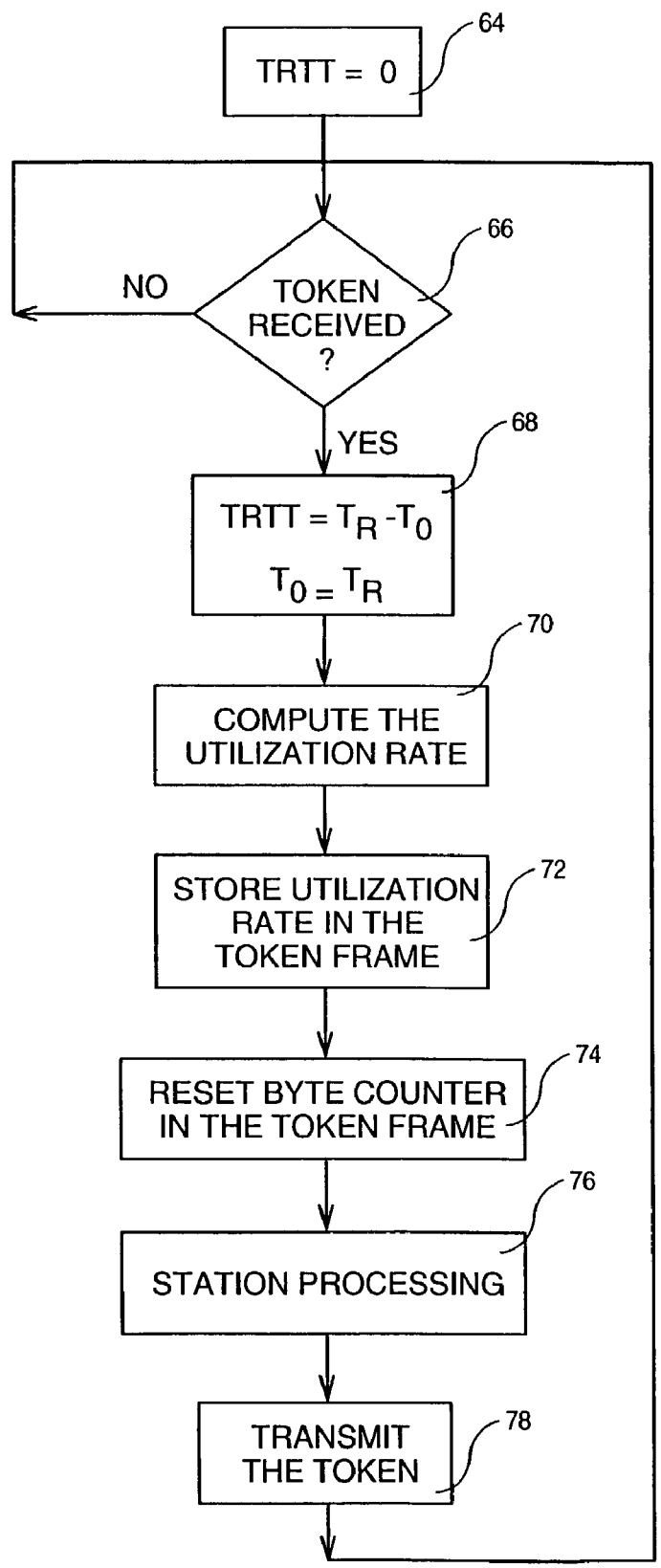
FIG. 4 is a flow chart representing the specific steps performed by the ring manager of the logical ring when receiving the token frame.

The flow chart of the steps achieved in the ring manager is illustrated in FIG. 4. At the initial time, the token round trip time (TRTT) is set to 0 (step 64). Then, the station waits for the token (step 66) and loops back as long as the token is not received. Upon receiving the token, the station notes the reception time $T_R$, and sets the variable TRTT to the value $T_R - T_0$ (representing the last token round trip time) and sets the variable $T_0$ to $T_R$ (step 68).

Then, the processing unit of the ring manager computes (step 70) the utilization rate of the logical ring by using the value of the byte counter in the token frame and the new value of TRTT in bits/s as follows:

Utilization Rate=Utilization/Maximum Bandwidth

With

Utilization=Byte Counter*8/TRTT

Wherein Maximum Bandwidth is a percentage of the logical ring capacity (e.g. 10 Mbits/s or 100 Mbits/s).

The value of Utilization Rate is then stored in the token frame (step 72) and the byte counter in the token frame is reset to zero (step 74).

After that, the ring manager performs the same processing as any other station (step 76) as described in reference to FIG. 3, and finally, sends the token frame to the next station over the logical ring (step 78). Note that, during processing by the ring manager, the incrementation of the byte counter in the token frame corresponds to the number of data bytes+the number of bytes in the token frame.

What is claimed is:

1. A method of bandwidth management for ensuring a guaranteed bandwidth to each station of a transmission network having a plurality of stations, the method comprising:

circulating a token frame from station to station along a logical ring formed from a plurality of stations where one station is the ring manager, and allowing each station to transmit data to other stations over said transmission network while holding said token; and allocating a credit of data bytes, said credit of data bytes specifying the number of data bytes that are allowed to be transmitted by a station upon reception of said token frame when a Utilization Rate based upon the number of data bytes sent by all stations since the preceding reception of said token frame is greater than a predetermined threshold, wherein said Utilization Rate is computed as follows:

Utilization Rate=Utilization/Maximum Bandwidth, wherein Utilization=Byte Counter*8/*TRTT,* wherein Maximum Bandwidth is a value that is a percentage of the logical ring capacity and TRTT is the round trip time for the token frame to circulate around said logical ring; and transmitting data from each station holding said token in response to the allocation of credits.

2. The method of claim 1, wherein said token frame contains a byte counter, the contents of which is incremented by each of said stations, said incrementation corresponding to the number of bytes being transmitted by said station.

3. The method of claim 2, wherein said byte counter is reset to zero upon reception of said token frame by said ring manager.

4. The method of claim 3, wherein said incrementation of said byte counter by said ring manager corresponds to the number of data bytes transmitted by said ring manager plus the number of bytes in said token frame.

5. A bandwidth management system for ensuring a guaranteed bandwidth a plurality of stations of a transmission network, the system comprising:

a plurality of stations configured to receive and detect a token frame and to transmit said token frame to a subsequent station of said plurality of stations thereby forming a logical ring on said transmission network;

the plurality of stations further configured to transmit data to other stations over said transmission network in response to receiving said token frame;

one station within the plurality of stations further configured to be a ring manager and compute a Utilization Rate based upon the number of data bytes sent by all stations since the preceding reception of said token frame and store said utilization rate within said token frame; and the plurality of stations further configured to compute a credit of data bytes, said credit of data bytes specifying the number of data bytes that are allowed to be transmitted by a station in response to receiving said token frame when said Utilization Rate is greater than a predetermined threshold, wherein said Utilization Rate is computed as follows:

Utilization Rate=Utilization/Maximum Bandwidth, wherein Utilization=Byte Counter*8/*TRTT,* wherein Maximum Bandwidth is a value that is a percentage of the logical ring capacity and TRTT is the round trip time for the token frame to circulate around said logical ring.

6. The system of claim 5, wherein said token frame contains a byte counter, and each station of the plurality of stations is configured to increment the contents of said byte counter, said incrementation corresponding to the number of bytes being transmitted by said station.

7. The system of claim 6, wherein said ring manager is further configured to reset said byte counter to zero upon reception of said token frame.

8. The system of claim 7, wherein said ring manager is further configured to increment said byte counter by an amount corresponding to the number of data bytes transmitted by said ring manager plus the number of bytes in said token frame.

9. The system of claim 8, wherein each station is further configured to increase said credit of data bytes by a number of data bytes equal to a value $C_1$=CIR*TRTT/8 when said Utilization Rate is greater than said predetermined threshold and wherein CIR stands for Committed Information Rate which is the guaranteed transmission rate that the station can use to transmit data.

10. A client station in a logical ring network comprising a plurality of other client stations, the client station comprising:

A buffer configured to receive and detect a token frame containing a byte counter and transmitting said token frame to a subsequent station of said plurality of stations; and A processor configured to compute a Utilization Rate based upon the value within said byte counter store said Utilization Rate within said token frame, wherein said Utilization Rate is computed as follows:

Utilization Rate=Utilization/Maximum Bandwidth, wherein Utilization=Byte Counter*8/*TRTT,* wherein Maximum Bandwidth is a value that is a percentage of the logical ring capacity and TRTT is the round trip time for the token frame to circulate around said logical ring.

11. The client station of claim 10, wherein said token frame contains a byte counter, the contents of which is incremented by each of said stations, said incrementation corresponding to the number of bytes being transmitted by said station.

12. The client station of claim 11, wherein said incrementation of said byte counter by said ring manager corresponds to the number of data bytes transmitted by said ring manager plus the number of bytes in said token frame.

13. The client station of claim 11, wherein the processor is further configured to set a value of TRTT upon receiving said token frame to $T_R$–$T_0$ wherein $T_R$ is the clock time when said token frame is received by said ring manager, and $T_0$ is a variable equal to the time when a preceding token frame was received.

14. The client station of claim 10, wherein said processor is configured to reset said byte counter to zero upon reception of said token frame by said ring manager.

15. The client station of claim 10, wherein the processor is further configured to compute said Utilization Rate as follows:

Utilization Rate=Utilization/Maximum Bandwidth; wherein

Utilization=Byte Counter*8/*TRTT*;

and wherein Maximum Bandwidth is a value that is a percentage of the logical ring capacity, Byte Counter is the value of said byte counter, and TRTT is the round trip time for the token frame to circulate around said logical ring.

16. The client station of claim 10, wherein the processor is further configured to reset said byte counter within said token frame to zero in response to reception of said token frame.

17. A method of operating a client station in a transmission network configured to ensure a guaranteed bandwidth to each station of the transmission network, comprising:

receiving a token frame that is circulated from station to station along a logical ring formed from a plurality of stations where one station is the ring manager; receiving an allocation of a credit of data bytes, said credit of data bytes specifying the number of data bytes that are allowed to be transmitted by a station upon reception of said token frame when a Utilization Rate based upon the number of data bytes sent by all stations since the preceding reception of said token frame is greater than a predetermined threshold, wherein said Utilization Rate is computed as follows:

Utilization Rate=Utilization/Maximum Bandwidth, wherein Utilization=Byte Counter*8/*TRTT*, wherein Maximum Bandwidth is a value that is a percentage of the logical ring capacity and TRTT is the round trip time for the token frame to circulate around said logical ring; and transmitting data to other stations over said transmission network while holding said token in response to the received allocation of credits.

18. A network protocol comprising instructions stored on a computer-readable storage medium that, when executed, implement said protocol for a plurality of stations of a transmission network, the instructions configured to generate:

A token frame configured to be transmitted along said transmission network to a plurality of stations that transmit data to other stations over said transmission network in response to receiving said token frame;

A Utilization Rate determined by a ring manager based upon the number of data bytes sent by all stations since the preceding reception of said token frame and store said utilization rate within said token frame; and A credit of data bytes specifying the number of data bytes that are allowed to be transmitted by a station in response to receiving said token frame when said Utilization Rate is greater than a predetermined threshold, wherein said Utilization Rate is computed as follows:

Utilization Rate=Utilization/Maximum Bandwidth, wherein Utilization=Byte Counter*8/*TRTT*, wherein Maximum Bandwidth is a value that is a percentage of the logical ring capacity and TRTT is the round trip time for the token frame to circulate around said logical ring.

19. An article of manufacture comprising a program storage medium readable by a processor and embodying one or more instructions executable by processor to perform a method of bandwidth management for ensuring a guaranteed bandwidth to each station of a transmission network having a plurality of stations, the method comprising:

circulating a token frame from station to station along a logical ring formed from a plurality of stations where one station is the ring manager, and allowing each station to transmit data to other stations over said transmission network while holding said token; and allocating a credit of data bytes, said credit of data bytes specifying the number of data bytes that are allowed to be transmitted by a station upon reception of said token frame when a Utilization Rate based upon the number of data bytes sent by all stations since the preceding reception of said token frame is greater than a predetermined threshold, wherein said Utilization Rate is computed as follows:

Utilization Rate=Utilization/Maximum Bandwidth;

wherein Utilization=Byte Counter*8/*TRTT*; and wherein Maximum Bandwidth is a value that is a percentage of the logical ring capacity and TRTT is the round trip time for the token frame to circulate around said logical ring.

20. The article of manufacture of claim 19, wherein said token frame contains a byte counter, the contents of which is incremented by each of said stations, said incrementation corresponding to the number of bytes being transmitted by said station.

21. The article of manufacture of claim 20, wherein said byte counter is reset to zero upon reception of said token frame by said ring manager.

22. The article of manufacture of claim 21, wherein said incrementation of said byte counter by said ring manager corresponds to the number of data bytes transmitted by said ring manager plus the number of bytes in said token frame.

* * * * *